(12) United States Patent
Lin et al.

(10) Patent No.: US 10,623,198 B2
(45) Date of Patent: Apr. 14, 2020

(54) SMART ELECTRONIC DEVICE FOR MULTI-USER ENVIRONMENT

(71) Applicant: XIAMEN ECO LIGHTING CO. LTD., Xiamen (CN)

(72) Inventors: Wuwei Lin, Xiamen (CN); Yuchun Ding, Xiamen (CN); Danqing Liu, Xiamen (CN)

(73) Assignee: XIAMEN ECO LIGHTING CO., LTD., Xiamen (CN)

( * ) Notice: Subject to any disclaimer, the term of this patent is extended or adjusted under 35 U.S.C. 154(b) by 30 days.

(21) Appl. No.: 15/435,284

(22) Filed: Feb. 16, 2017

(65) Prior Publication Data

US 2018/0048479 A1 Feb. 15, 2018

(30) Foreign Application Priority Data

Aug. 11, 2016 (CN) .......................... 2016 1 0657370

(51) Int. Cl.
*H04L 12/28* (2006.01)
*G06F 3/01* (2006.01)
(Continued)

(52) U.S. Cl.
CPC ............ *H04L 12/282* (2013.01); *G06F 3/017* (2013.01); *G06F 3/167* (2013.01); *G06F 21/32* (2013.01); *G06K 9/00355* (2013.01); *G08G 1/123* (2013.01); *G10L 15/22* (2013.01); *H04L 12/2803* (2013.01); *H04N 7/181* (2013.01); *H04N 21/4122* (2013.01); *H04N 21/4131* (2013.01); *H04N 21/4223* (2013.01); *H04N 21/42201* (2013.01); *H04N 21/42203* (2013.01); *H04N 21/43615* (2013.01); *H04N 21/4415* (2013.01); *G10L 2015/223* (2013.01);
(Continued)

(58) Field of Classification Search
CPC .............. H04L 12/282; H04L 12/2803; H04N 21/43615; H04N 21/436; H04N 7/181; H04N 21/4131; H04N 21/42203; H04N 21/4223; G06K 9/0355; G08G 1/123; G10L 15/22; G06F 3/167; G06F 3/017; G06F 21/32
See application file for complete search history.

(56) References Cited

U.S. PATENT DOCUMENTS

2005/0187703 A1* 8/2005 Seligmann ............. G08G 1/123
701/400
2007/0250920 A1* 10/2007 Lindsay .................. G06F 21/31
726/7

(Continued)

*Primary Examiner* — David E Harvey
(74) *Attorney, Agent, or Firm* — Chun-Ming Shih; Lanway IPR Services

(57) ABSTRACT

A smart electronic device is provided for a multi-user environment to meet more convenient life requirements of a plurality of users. The smart electronic device has a camera, a microphone, a processing circuit, a network interface and a projector. The processing circuit loads a user's image and determines an identity of the user appearing before the camera based on the user's image. The processing circuit also analyzes a gesture of the user fetched by the camera or a voice message fetched by the microphone for transforming into a corresponding operating command. The projector displays a frame generated in correspondence to the operating command.

28 Claims, 4 Drawing Sheets

(51) Int. Cl.
*H04N 21/4415* (2011.01)
*G06F 21/32* (2013.01)
*H04N 21/436* (2011.01)
*H04N 21/41* (2011.01)
*H04N 21/422* (2011.01)
*G06F 3/16* (2006.01)
*G06K 9/00* (2006.01)
*G08G 1/123* (2006.01)
*G10L 15/22* (2006.01)
*H04N 7/18* (2006.01)
*H04N 21/4223* (2011.01)
*H04W 4/80* (2018.01)
*H04W 84/12* (2009.01)

(52) U.S. Cl.
CPC ....... *H04L 2012/2841* (2013.01); *H04W 4/80* (2018.02); *H04W 84/12* (2013.01)

(56) References Cited

U.S. PATENT DOCUMENTS

| | | | | |
|---|---|---|---|---|
| 2014/0062882 | A1* | 3/2014 | Ozawa | G06F 3/038 |
| | | | | 345/158 |
| 2014/0351847 | A1* | 11/2014 | Ochiai | H04N 21/2542 |
| | | | | 725/30 |
| 2015/0264439 | A1* | 9/2015 | Karlin | H04N 21/42202 |
| | | | | 725/12 |
| 2017/0111423 | A1* | 4/2017 | Cui | H04L 65/608 |
| 2017/0264947 | A1* | 9/2017 | Gerhards | H04N 21/6143 |
| 2018/0107445 | A1* | 4/2018 | Ohmura | G06F 3/16 |

* cited by examiner

SMART ELECTRONIC DEVICE FOR MULTI-USER ENVIRONMENT

TECHNICAL FIELD

The present invention relates to a smart household electronic device and system, and more particularly, to an electronic device and system capable of integrating intellectualization of multiple household scenes.

BACKGROUND

With improvement of electronic technologies and reduced cost, more and more applications are developed for meeting various requirements of people and for providing more convenient and comfortable quality of life. However, because of various electronic devices disposed for meeting different requirements, disposition of household electronic devices is more likely in a mess. Besides, effective integration and communication is often missing between these electronic devices, so that it introduces much inconvenience for a user who has many electronic devices though. Therefore, more substantial technical performances will be achieved if a more integrated and efficient design of electronic devices is developed for better meeting people's requirements and for more efficient communications between electronic devices.

SUMMARY OF INVENTION

According to an embodiment of the present invention, a smart electronic device is provided to meet more convenient life requirements of a plurality of users. For example, the smart electronic device may be disposed in a family, an office, a factory, a restaurant or the like, where a plurality of users are active at.

In one embodiment, the smart electronic device includes a housing. The housing has a base for disposition on a surface for usage, such as a table surface or ground. A camera is disposed at a specific location on the housing and configured to fetch an image of a user appearing before the camera. The camera may be disposed in a movable or mobile manner. Besides, external cameras may be connected in a wired or wireless manner. The fetched image may be one or more video streams. The fetched image may be a static frame, such as a conventional graphic file.

A microphone is disposed at a specific position on the housing and configured to fetch a voice message issued by the user. The microphone may be disposed in an external device, such as a cellphone, for transmitting information to the smart electronic device for further processing.

A processing circuit is installed on the housing, connected to the camera, configured to thereby load the image of the user for determining an identity of the user appearing before the camera. The processing circuit may also be configured to analyze a gesture of the user fetched via the camera or the voice message fetched via the microphone for transforming into a corresponding operating command.

The processing circuit may be a small-scale calculator, such as Raspberry PI, an Android device, a single-chip device, or other customized circuits. The processing circuit may complete the further processing by cooperating with corresponding software.

A network interface is installed on the housing and connected to the processing circuit for enabling the processing circuit to communicate with a cooperative device and an external server. The network interface includes a circuit supporting to one or more communication protocols, such as Wi-Fi, Zigbee, Z-Wave, RJ-45, or 3G/4G/5G, that match conventional standards or customized standards. The network interface may cooperate with pure hardware or corresponding software for enabling communications. The circuit may support multiple communication protocols and may include a plurality of network circuits capable of separate operations for providing interactions between the processing circuit and one or more external machines of various types.

The cooperative device may be another smart electronic device having the same configuration with the smart electronic device. The cooperative device may also be another smart electronic device having more or less elements than the smart electronic device. For example, the cooperative device may be a child device of the smart electronic device, and the smart electronic device acts as a parent device. Communications between the parent device and the child device are operated via the network interface. In one embodiment, both the parent device and the child device are designed and made by a same fabricator or have a same communication/processing interface. Therefore, the parent device may transmit a processing command, a notice or other related information to the child device via a predetermined rule. On the contrary, the child device may also transmit a processing command, a notice or other related information to the parent device.

For example, a parent device may be disposed in a parlor, and three other cooperative devices acting as child devices are respectively disposed in three other separated rooms. Each of the parent device and the child devices is installed with a camera for fetching images of the parlor and the rooms. When the parent device cooperates with the child devices, an image of each corner of the environment can be fetched. When a specific user is active within the environment, the processing circuit may identify the specific user's identity by a video, a voice, a fingerprint on the smart electronic device or other identity identifying mechanisms. Therefore, operating commands corresponding to the specific user are automatically transmitted to a child device or a parent device that is closest to the specific user for execution, for example, playing music, video, incoming calls, or other information.

The processing circuit transmits cooperative calculation requests to an external server via the network interface. The cooperative calculation requests include, but not limited to, voice recognition, computer vision recognition, and access commands to database. The cooperative device may be used at different locations of the multi-user environment. The processing circuit and the cooperative device cooperate at different locations of the multi-user environment via the network interface for enabling inter-user applications between the plurality of users.

The projector is installed on the housing, is connected to the processing circuit, and is configured to display a frame generated corresponding to the operating command. In addition, in different designs, the projector may also cooperate with a remote projecting circuit, for example, to transmit a frame information to another external displaying device such as a cellphone or a television.

In one embodiment, the processing circuit displays a video according to an operating command transformed from a user's gesture. Therefore, the user is not required to touch the smart electronic device, instead, he or she can merely give a certain gesture before the camera; and the processing circuit identifies the gesture to transform into an operating command of a video, such as play, fast forward, slow forward, pause, or record. The operations may be used to fast forward, play, or pause a video via a corresponding frame displayed by the projector or other connected display devices.

In another embodiment, the processing circuit may identify a user's identity according to a voice message fetched by the microphone for determining whether to proceed operations based on the user's identity. For example, the processing circuit may pre-store a voice feature of the user, fetch a voice of the user using the microphone, and compare the pre-stored voice feature with the fetched voice to identify an identity of the user in the proximity of the smart electronic device. In another embodiment, the voice fetched by the microphone is transmitted to a remote server or a nearby cellphone; the fetched voice is calculated with the aid of an electronic device such as the remote server or the nearby cellphone; and recognition results returned by the electronic device will be used for further operations.

In another embodiment, after the processing circuit identifies the user's identity, the processing circuit displays information corresponding to the user. In addition to using a microphone for identifying the user's identity, mechanisms including RF-ID technology, video analysis, iris recognition, fingerprint recognition may also be used to identify the user's identity.

In another embodiment, if the processing circuit confirms a plurality of users appearing in the proximity of the corresponding smart electronic device, the processing circuit determines whether to display information corresponding to one of the plurality of users according to a predetermined rule. For example, when a user A is identified in the proximity of the smart electronic device, and when another user B is also identified in the same proximity, the information belonging only to A may not be proper for displaying. The user is enabled to set the rule of displaying the information. For example, the smart electronic device may set the rule via a voice input, a touch panel interface, or an external electronic device, such as a cellphone or a computer.

Besides, the smart electronic device may also determine to display information directly, such as contents of an email or a short message, to wait for the user's confirmation for reviewing the information, or not to notify directly according to the information. For example, if the information contains a confidential keyword or tag, such as "classified", "confidential", or "secret", the information may be set to be displayed under only the user A's confirmation. Or an identity of the information's sender may also be considered as a factor to display the information or not.

These rules may be set using XML or a database, and may be stored in the smart electronic device for future access.

In another embodiment, the smart electronic device may register on at least one external server via the network interface according to an identified user's identity and/or a pre-stored register information. For example, the user may pre-store his/her account and password in the smart electronic device. Once the smart electronic device determines that the user is in its proximity, the smart electronic device may use the pre-stored account and password to automatically connect to servers corresponding to one or more emails, shopping, social networks.

The collected information may be integrated. For example, messages from email boxes, short messages, or social networks may be integrated to a same interface and provided to the user in voices or images. In addition, push messages subscribed by the user may also be transmitted or displayed to the user according to a rule or a setting.

In another embodiment, when the transmitted information of a server includes a purchase information, such as an Amazon™ purchase information, and if the user is willing purchase a product or service, he/she may order using his/her voice or fingerprints for recognition, i.e., one or more ways for recognition, the processing circuit directly uses the pre-stored user account and password to order the product or service and transmits a purchase request to a remote server to complete the ordering.

For example, the projector may display a video advertisement or a product introduction, and the user may tell the smart electronic device directly for purchasing. The processing circuit may register the server using the pre-stored account and password for ordering a designated product or service. Besides, the purchase may also indicate ordering digital contents, such as ordering music. For example, when the user is watching or listening to a multimedia program, he or she can use a gesture or other operating command to rewind to a previous watched video or listened audio that he or she is interested in. Once the user decides to purchase, the smart electronic device uses the pre-stored account and password to connect to a purchasing server for purchasing.

In another embodiment, the user may see a product in a video that does not provide purchasing information of the product. At this time, the user may click on the product or transmit a snapshot of the video to one or more server that directly or indirectly enables the user to purchase the product. These information are transmitted to a remote server for comparing the snapshot with product records in its database. If the corresponding product is found, the server may inquire the user's intention to buy the product; if the user's intention is confirmed to be positive, a purchasing interface may be displayed to the user, or the pre-stored account and password are directly used to complete the purchase.

For example, the user may see the leading actor's watch or the leading actress's purse while watching a movie. The user may issue a command using his/her voice or other ways. Then, the processing circuit transmits information, such as a corresponding frame or voice, to a remote server for initiating the product comparison. The processing circuit also helps directly or indirectly in completing the purchase or adding the product to an interested list for future purchases.

Same operations may also be applied in purchasing music products. For example, when a user listens to a radio station or watches a movie, the user may search for a purchasable and interested product via video comparison and complete the purchase.

In another embodiment, the processing circuit is connected to an external server via the network interface for retrieving a time information that indicates an arrival time of a public transportation vehicle to a station. By incorporating a moving time that the user moves to the station, the processing circuit is capable of calculating a proper time for reminding the user to set off to the station for taking the public transportation vehicle. For example, when a family is dining in a restaurant, the processing circuit may automatically connect to one or more remote server using pre-stored user information for inquiring if vehicles of the family's members are in the proximity or have arrived. Also, the information may be used for reminding members of the family, such as the father, the mother, or their children.

Because the subscribing service of private car or rental car is popular, the reminders may also be issued by the processing circuit's connection to the corresponding server. Because the user may need a time interval to move to the bus station or other public transportation vehicles, the time interval for moving is also automatically determined and calculated by the processing circuit using the pre-stored information.

In another embodiment, the cooperative device may include a feeding device, and the processing circuit controls the cooperative device via the network interface for feeding pets via the feeding device. For example, the cooperative device includes a food deposit manger, and may watch his/her own pet or automatically feed it according to a presetting or a remote control. The cooperative device may also be applied on attendance of plants. Routines for the plants may be more flexible with the aid of a camera.

In another embodiment, the cooperative device may be plural, and each of the cooperative device has a camera. The processing circuit integrates image information from the camera of the smart electronic device and cameras of the plurality of cooperative devices for integrally determining a current situation of its surrounding environment. In other words, the processing circuit may inquire other cooperative devices via the network interface about if there is any human activities within different regions of the environments. The cooperative devices and the smart electronic device may have a same configuration or different configurations. For example, the cooperative device may also be a sensor for sensing human activities, a luminance device installed on the ceiling, or another apparatus or electronic device.

In another embodiment, the processing circuit may automatically edit frames fetched by cameras of the smart electronic device and at least one cooperative device to generate at least one subscribible video stream. The at least one video stream may be used for security check or further processing.

For example, the processing circuit may determine a current location of a certain user in the environment according to at least one integrated video stream.

In another embodiment, the processing circuit may transmit multimedia data to a cooperative device at the location of the certain user to display. For example, the user may move around different meeting rooms of a same office; at this time, different cooperative devices may cooperate each other for display the multimedia data on only cooperative devices at the current location of the user, such as displaying music.

In another embodiment, the processing circuit transmits scheduled tasks to the cooperative device for further processing when power of the smart electronic device is lower than a predetermined value. If power of the smart electronic device is supplied via batteries, the processing circuit may transfer part of the processing tasks to other cooperative devices for further processing when the power is insufficient or under a user-set operating mode.

In another embodiment, the smart electronic device may further include a vibration sensor. The processing circuit transforms vibration, which is transmitted from the base to the vibration sensor, to a corresponding operating command. For example, when the smart electronic device is disposed on a table, the vibration sensor may sense the user's vibration on the table including a pat or a touch-control command, and the processing circuit transforms the sensed vibration to a corresponding operating command.

For example, the operating command may be used on an alarm clock application. In other words, when the user pats on a nearby table, the processing circuit may determine and close the alarm clock.

In another embodiment, the processing circuit analyzes a voice fetched by the microphone or an image fetched by the camera for determining if a preset condition occurs. When the preset condition occurs, the processing circuit issues a notice to at least one external device via the network interface. The preset condition may include a condition that a user needs help.

For example, if the smart electronic device or its cooperative device senses an emergency call of an aged or a patient, or crying or quilt-kicking of a baby, the smart electronic device may inform a certain user in the proximity of a certain cooperative device.

For example, the smart electronic device may determine a current location of a user that can help by cooperating with cooperative devices of various locations. The smart electronic device may thereby activate a cooperative device or another smart electronic device of the corresponding location to remind or notify.

Besides, the issued notice may include a video or a frame fetched by the camera. For example, a mother may thereby be informed of her baby's crying and determine whether to deal with immediately or wait for a while.

Besides, the notice may be transmitted to other nearby or remote electronic devices, such as a cellphone or a computer.

In another embodiment, the processing circuit receives a sport or physiological information of a certain user from at least one smart sport device via the network, such as a number of steps of running/walking or heart beats. The processing circuit may activate different corresponding operations according to the sport or physiological information. For example, when the certain user eats, the processing circuit may provide diet recommendation information corresponding to the certain user.

In another embodiment, the smart electronic device may further include a human proximity sensor; when the human proximity sensor senses that no one is moving in the proximity of the smart electronic device, the processing circuit may enter a power saving mode. The human proximity sensor may receive sensing information via an infrared sensor or a ultrasound sensor. The sensor or an ultrasound sensor may be installed on the human proximity sensor or be disposed at another location in a wired or wireless manner.

Besides, when the smart electronic device senses human activities in its proximity, a switch may be designed to automatically activate the processing circuit for processing, or may be designed to automatically switch off the processing circuit or other devices to a sleeping mode when the sensed activities leave the proximity.

Besides, in another embodiment, the base may be disposed on a wireless charging base for wireless charging, and may not be in contact with from the wireless charging base.

Besides, in another embodiment, the smart electronic device may further include a luminance device installed on the housing. The luminance device may give corresponding luminance according to a control from the processing circuit.

DETAILED DESCRIPTION

Figure 1:
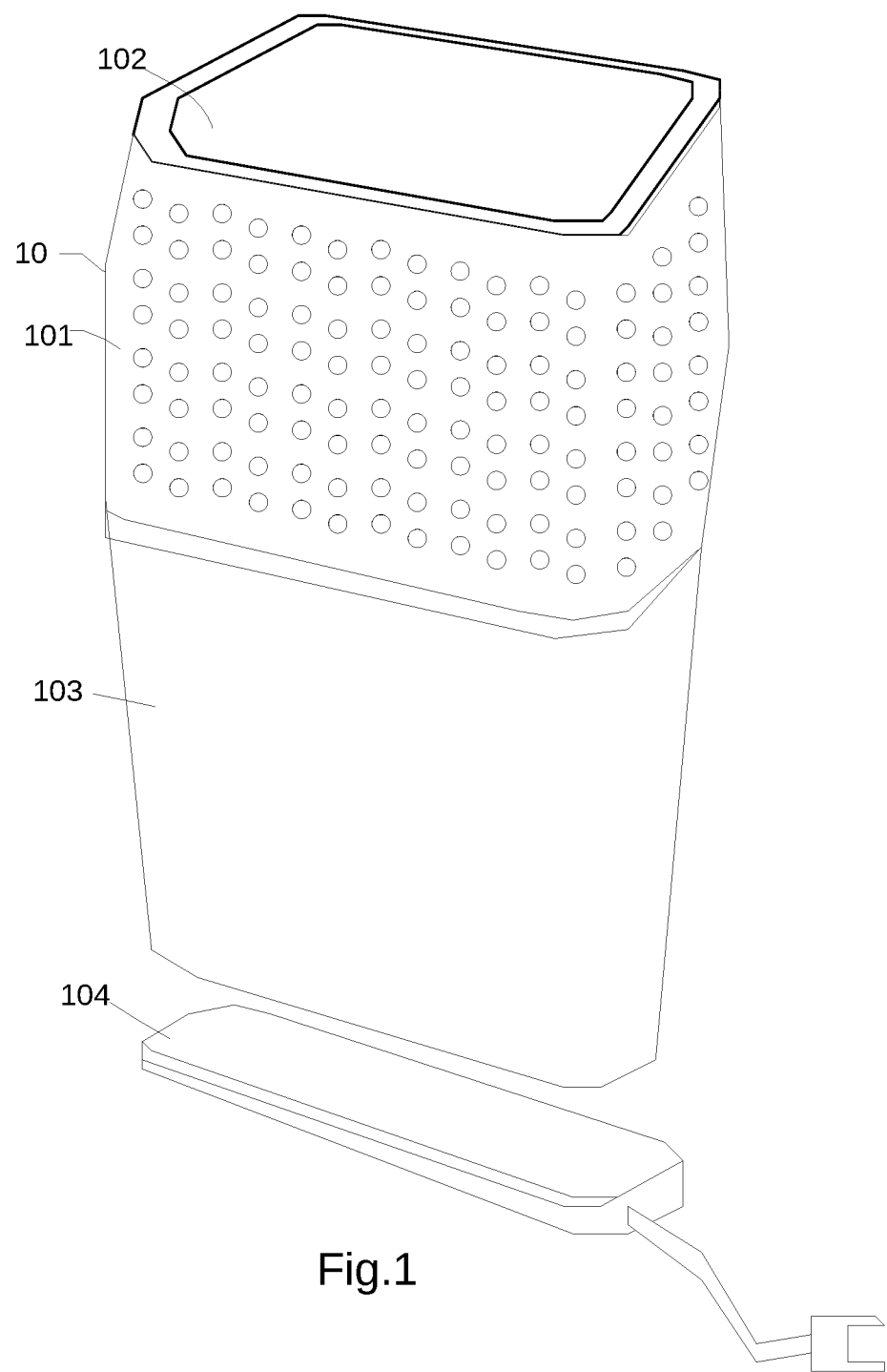
FIG. 1 is a dimensional view of one embodiment of the present invention.

Please refer to FIG. 1 which illustrates one embodiment of the present invention. A smart electronic device 10 includes an LED display screen 102 at the top side for providing partial information and enabling touch operations. A speaker 101 may play sound effects. And a lamp 103 may provide corresponding smart luminance. The smart electronic device 10 may be charged via a wireless charging base 104. However, the smart electronic device 10 may also be designed to be fixedly charged.

This type of smart electronic device is used for a multi-user environment for meeting their more convenient life requirements. For example, this type of smart electronic device may be disposed in a family house, an office, a factory, or a restaurant where a plurality of users are moving within.

Figure 2:
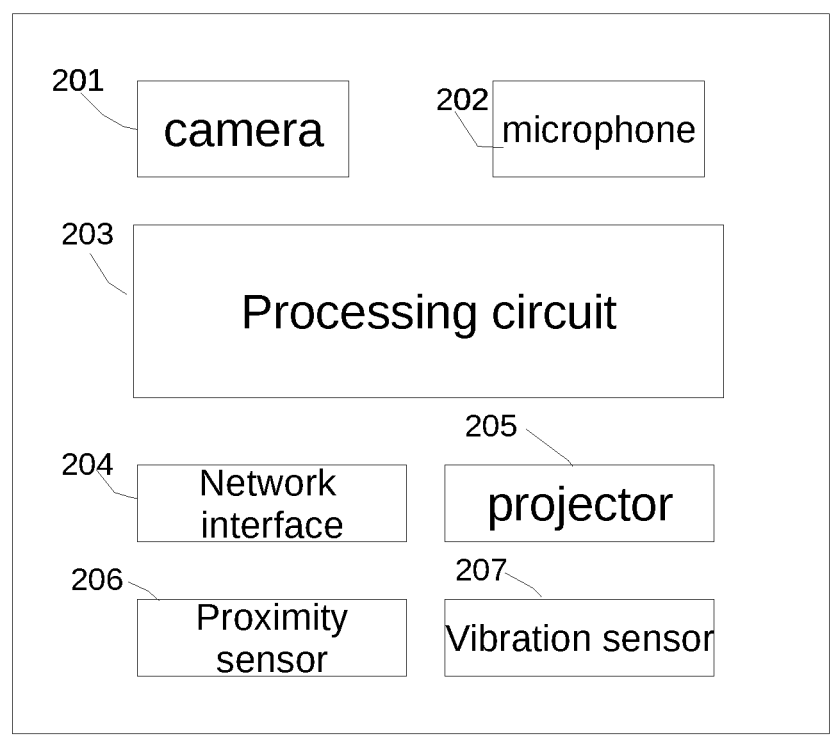
FIG. 2 is a systematic structure diagram according to one embodiment of the present invention.

Please refer to FIG. 2, which illustrates a systematic diagram according to one embodiment. The smart electronic device has a camera 201, a microphone 202, a processing circuit 203, a network interface 204, a projector 205, a proximity sensor 206, and a vibration sensor 207. Note that a designer may add or reduce used elements in the smart electronic device during the fabrication process, for example, to remove the vibration sensor 207. The elements may be serially connected in a wired or wireless manner for implementing the following functions. Since the related electronic technologies have been highly developed, the designer can implement different combinations of hardware and software designs of the present invention according to the following descriptions. For brevity, the implementation details of the present invention will not be further described in detail.

The smart electronic device may have a housing. The housing has a base, so that the housing may be disposed on a conventional planar surface, such as a table's surface or the ground. The camera 201 is disposed at a specific location on the housing for fetching an image of a user appearing before the camera 201. The camera 201 may be disposed in a mobile or movable manner. Additionally, the camera 201 may be connected to an external camera in a wired or wireless manner. The fetched image may be an image stream or a plurality of image streams. The fetched image may be a static image, such as a conventional graphic file.

The microphone 202 is disposed at a specific location on the housing for fetching a voice message from a user. The microphone 202 may also be disposed on an external device, such as a cellphone, for indirectly transmitting the voice message to the smart electronic device for further processing.

The processing circuit 203 is installed on the housing. The processing circuit 203 may be connected to the camera 201 for loading the user's image and for determining an identity of the user appearing before the camera 201 according to the user's image. Besides, the processing circuit 203 may also analyze a user's gesture fetched by the camera 201 or the voice message fetched by the microphone 202 for transmitting into a corresponding operating command.

The processing circuit 203 may be a small-scale calculator, such as Raspberry PI, an Android device, a single-chip device, or a customized circuit. The processing circuit 203 may also cooperate with a corresponding software or program to complete the following processing or calculations.

The network interface 204 is installed on the housing and is connected to the processing circuit 203 for enabling the processing circuit 203 to communicate with a cooperative device and an external server. The network interface 204 includes a circuit corresponding to one or more communication protocols, such as conventional or customized standard communication protocols including Wi-Fi, Bluetooth, Zigbee, Z-Wave, RJ-45, or 3G/4G/5G. The network interface 204 may be a circuit supporting multiple communication protocols; however, the circuit may include a plurality of network circuits that respectively operate in a separated manner; and the circuit may thus enable the processing circuit to interact with machines of one or more types. The cooperative device may be another smart electronic device having the same disposition as the smart electronic device. The cooperative device may also be an electronic device having more or less apparatuses than the smart electronic device. For example, the cooperative device may be a child device of the smart electronic device, and the smart electronic device acts as a parent device. Communications between the parent device and the child device are operated via the network interface. In one embodiment, both the parent device and the child device are designed and made by a same fabricator or have a same communication/processing interface. Therefore, the parent device may transmit a processing command, a notice or other related information to the child device via a predetermined rule. On the other hand, the child device may also transmit a processing command, a notice or other related information to the parent device.

Figure 3:
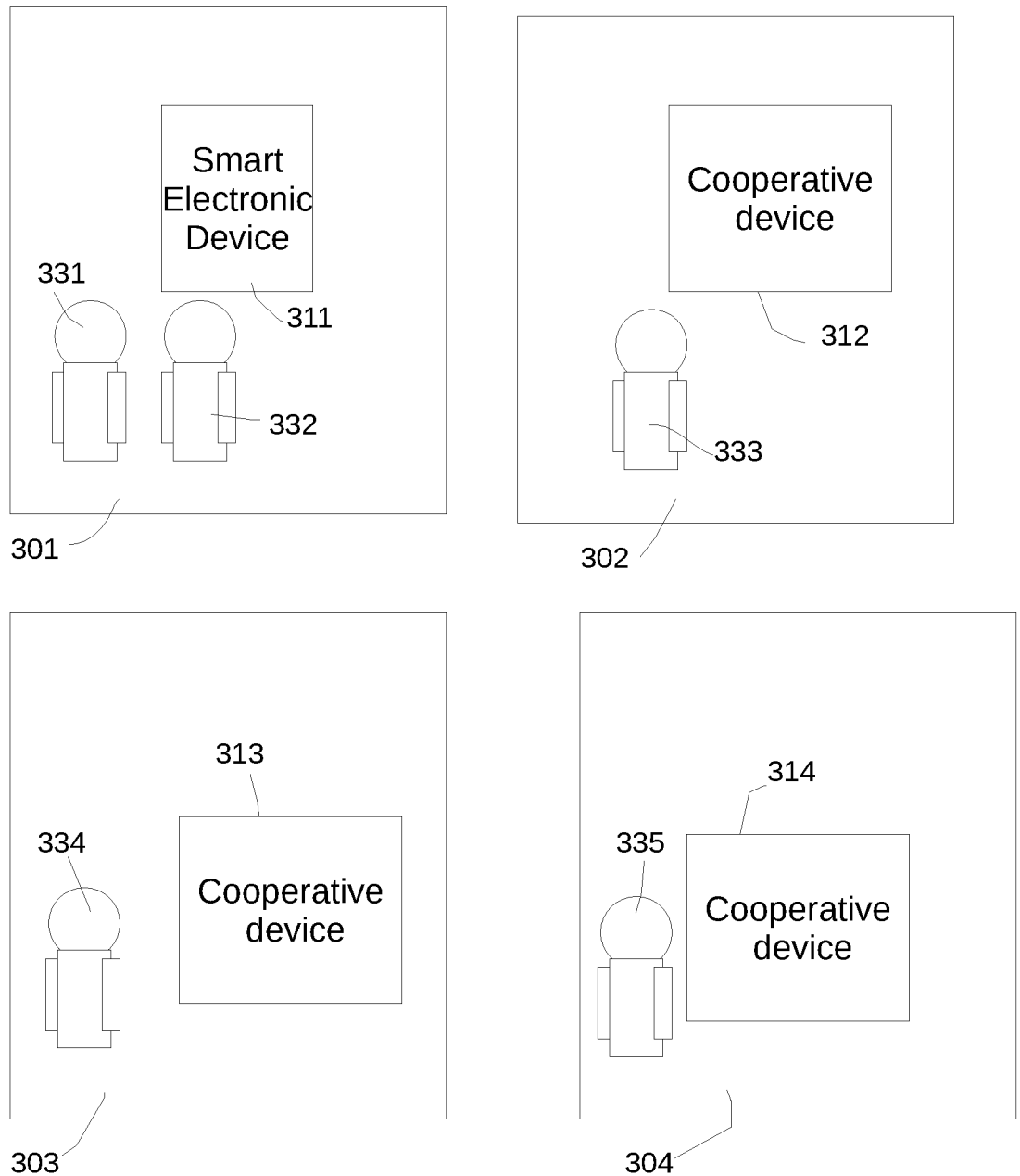
FIG. 3 is a schematic diagram of usage according to one embodiment of the present invention.

For example, please refer to FIG. 3. A smart electronic device 311 acting as a parent device may be disposed in a parlor 301, and three other cooperative devices 312, 313 and 314 acting as child devices are respectively disposed in three other separated rooms 302, 303 and 304. Each of the parent device 311 and the child devices 312, 313 and 314 is installed with a camera for fetching images of the parlor 301 and the rooms 302, 303 and 304. When the parent device 311 cooperates with the child devices 312, 313 and 314, an image of each corner of the environment can be fetched. When a specific user is active within the environment, the processing circuit 203 may identify the specific user's identity by a video, a voice, a fingerprint on the smart electronic device or other identity identifying mechanisms. Therefore, operating commands corresponding to the specific user are automatically transmitted to a child device or a parent device that is closest to the specific user for execution, for example, playing music, video, incoming calls, or other information. In these rooms, a plurality of users 331, 332, 333, 334 and 335 may be moving inside.

Figure 4:
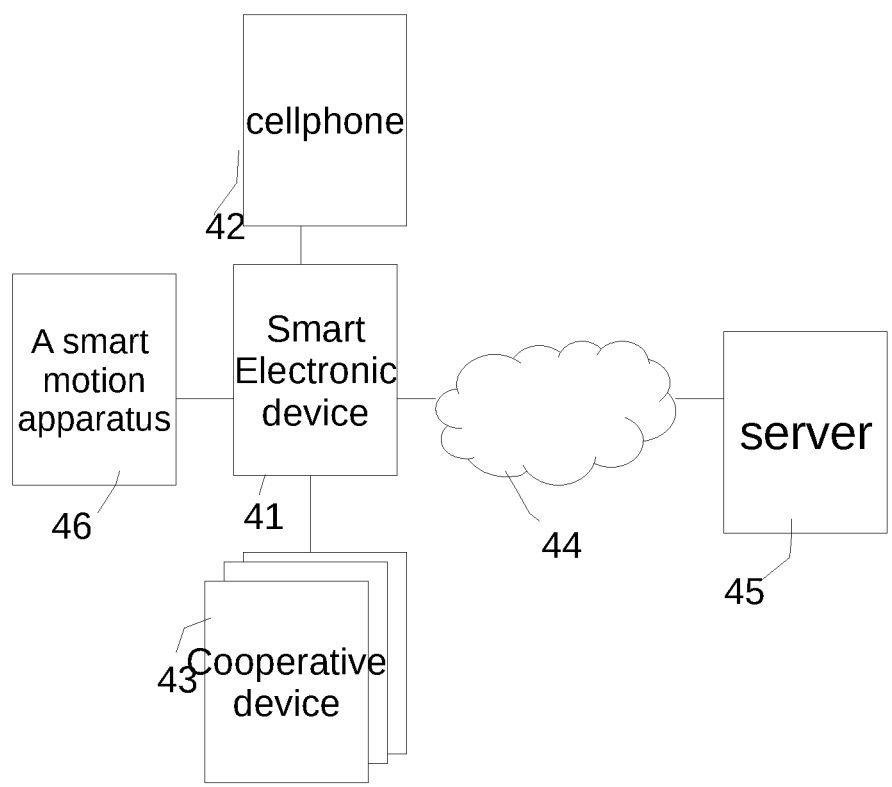
FIG. 4 illustrates how multiple devices interact with each other.

Besides, please refer to FIG. 4. In addition to cooperating with one or more cooperative devices, a smart electronic device 41 may also be connected to a server 45 via a network 44, load sensor information from a smart motion apparatus 46, or be connected to a cellphone 42 for cooperation.

The processing circuit transmits cooperative calculation requests to an external server via the network interface. The cooperative calculation requests include, but not limited to, voice recognition, computer visual recognition, and access commands to databases. The cooperative device may be used at different locations of the multi-user environment. The processing circuit and the cooperative device cooperate at different locations of the multi-user environment via the network interface for enabling inter-user applications between the plurality of users.

The projector is installed on the housing, is connected to the processing circuit, and is configured to display a frame generated corresponding to the operating command. In addition, in different designs, the projector may also cooperate with a remote projecting circuit, for example, to transmit a frame information to another external displaying device such as a cellphone or a television.

In one embodiment, the processing circuit displays a video according to an operating command transformed from a user's gesture. Thus, the user is not required to touch the smart electronic device, instead, he or she can merely give a certain gesture before the camera; and the processing circuit identifies the gesture and transforms it into an operating command of a video, such as play, fast forward, slow forward, pause, or record. The operations may be used to fast forward, play, or pause a video via a corresponding frame displayed by the projector or other connected display devices.

In another embodiment, the processing circuit may identify a user's identity according to a voice message fetched by the microphone for determining whether to proceed operations based on the user's identity. For example, the processing circuit may pre-store a voice feature of the user, fetch a voice of the user using the microphone, and compare the pre-stored voice feature with the fetched voice to identify an identity of the user in the proximity of the smart electronic device. In another embodiment, the voice fetched by the microphone is transmitted to a remote server or a nearby cellphone; the fetched voice is calculated with the aid of an electronic device such as the remote server or the nearby cellphone; and recognition results returned by the electronic device will be used for further operations.

In another embodiment, after the processing circuit identifies the user's identity, the processing circuit displays information corresponding to the user. In addition to using a microphone for identifying the user's identity, mechanisms including RF-ID technology, video analysis, iris recognition, fingerprint recognition may also be used to identify the user's identity.

In another embodiment, if the processing circuit confirms a plurality of users appearing in the proximity of the corresponding smart electronic device, the processing circuit determines whether to display information corresponding to one of the plurality of users according to a predetermined rule. For example, when a user A is identified in the proximity of the smart electronic device, and when another user B is also identified in the same proximity, the information belonging only to A may not be proper for displaying. The user is enabled to set the rule of displaying the information. For example, the smart electronic device may set the rule via a voice input, a touch panel interface, or an external electronic device, such as a cellphone or a computer.

Besides, the smart electronic device may also determine whether to display information directly, such as contents of an email or a short message, whether to wait for the user's confirmation for reviewing the information, or whether not to notify directly according to the information. For example, if the information contains a confidential keyword or tag, such as "classified", "confidential", or "secret", the information may be set to be displayed under only the user A's confirmation. Or an identity of the information's sender may also be considered as a factor to display the information or not.

These rules may be set using XML or a database, and may be stored in the smart electronic device for future access.

In another embodiment, the smart electronic device may register on at least one external server via the network interface according to an identified user's identity and/or a pre-stored register information. For example, the user may pre-store his/her account and password in the smart electronic device. Once the smart electronic device determines that the user is in its proximity, the smart electronic device may use the pre-stored account and password to automatically connect to servers corresponding to one or more emails, shopping, social networks.

The collected information may be integrated. For example, messages from email boxes, short messages, or social networks may be integrated to a same interface and provided to the user in voices or images. In addition, push messages subscribed by the user may also be transmitted or displayed to the user according to a rule or a setting.

In another embodiment, when the transmitted information of a server includes a purchase information, such as an Amazon™ purchase information, and if the user is willing purchase a product or service, he/she may order using his/her voice or fingerprints for recognition, i.e., one or more ways for recognition, the processing circuit directly uses the pre-stored user account and password to order the product or service and transmits a purchase request to a remote server to complete the ordering.

For example, the projector may display a video advertisement or a product introduction, and the user may tell the smart electronic device directly to order an interested product. The processing circuit may register the server using the pre-stored account and password for ordering a designated product or service. Besides, the purchase may also indicate ordering digital contents, such as ordering music. For example, when the user is watching or listening to a multimedia program, he or she can use a gesture or other operating command to rewind to a previous watched video or listened audio that he or she is interested in. Once the user decides to purchase, the smart electronic device uses the pre-stored account and password to connect to a purchasing server for purchasing.

In another embodiment, the user may see a product in a video that does not provide purchasing information of the product. At this time, the user may click on the product or transmit a snapshot of the video to one or more server that directly or indirectly enables the user to purchase the product. These pieces of information are transmitted to a remote server for comparing the snapshot with product records in its database. If the corresponding product is found, the server may inquire the user's intention to buy the product; if the user's intention is confirmed to be positive, a purchasing interface may be displayed to the user, or the pre-stored account and password are directly used to complete the purchase.

For example, the user may see the leading actor's watch or the leading actress's purse while watching a movie. The user may issue a command using his/her voice or other ways. Then, the processing circuit transmits information, such as a corresponding frame or voice, to a remote server for initiating the product comparison. The processing circuit also helps directly or indirectly in completing the purchase or adding the product to an interested list for future purchases.

Same operations may also be applied in purchasing music products. For example, when a user listens to a radio station or watches a movie, the user may search for a purchasable and interested product via video comparison and complete the purchase.

In another embodiment, the processing circuit is connected to an external server via the network interface for retrieving a piece of time information that indicates an arrival time of a public transportation vehicle to a station. By incorporating a moving time needed for the user to move to the station, the processing circuit is capable of calculating a proper time for reminding the user to set off to the station for taking the public transportation vehicle. For example, when a family is dining in a restaurant, the processing circuit may automatically connect to one or more remote server using pre-stored user information for inquiring if vehicles of the family's members are in the proximity or have arrived. Also, the information may be used for reminding members of the family, such as the father, the mother, or their children.

Because subscribing service of private car or rental car is popular, the reminders may also be issued by the processing circuit's connection to the corresponding server. Since the user may need a time interval to move to the bus station or other public transportation vehicles, the time interval for moving is also automatically determined and calculated by the processing circuit using the pre-stored information.

In another embodiment, the cooperative device may include a feeding device, and the processing circuit controls the cooperative device via the network interface for feeding pets via the feeding device. For example, the cooperative device includes a food deposit manger, and may watch his/her own pet or automatically feed it according to a presetting or a remote control. The cooperative device may also be applied on attendance of plants. Routines for the plants may be more flexible with the aid of a camera.

In another embodiment, the cooperative device may be plural, and each of the cooperative device has a camera. The processing circuit integrates image information from the camera of the smart electronic device and cameras of the plurality of cooperative devices for integrally determining a current situation of its surrounding environment. In other words, the processing circuit may inquire other cooperative devices via the network interface about if there is any human activities within different regions of the environments. The cooperative devices and the smart electronic device may have a same configuration or different configurations. For example, the cooperative device may also be a sensor for sensing human activities, a luminance device installed on the ceiling, or another apparatus or electronic device.

In another embodiment, the processing circuit may automatically edit frames fetched by cameras of the smart electronic device and at least one cooperative device to generate at least one subscribible video stream. The at least one video stream may be used for security check or further processing.

For example, the processing circuit may determine a current location of a certain user in the environment according to at least one integrated video stream.

In another embodiment, the processing circuit may transmit multimedia data to a cooperative device at the location of the certain user to display. For example, the user may move around different meeting rooms of a same office; at this time, different cooperative devices may cooperate each other for display the multimedia data on only cooperative devices at the current location of the user, such as playing music.

In another embodiment, the processing circuit transmits scheduled tasks to the cooperative device for further processing when power of the smart electronic device is lower than a predetermined value. If power of the smart electronic device is supplied via batteries, the processing circuit may transfer part of the processing tasks to other cooperative devices for further processing when the power is insufficient or under a user-set operating mode.

In another embodiment, the smart electronic device may further include a vibration sensor. The processing circuit transforms vibration, which is transmitted from the base to the vibration sensor, to a corresponding operating command. For example, when the smart electronic device is disposed on a table, the vibration sensor may sense the user's vibration on the table including a pat or a touch-control command, and the processing circuit transforms the sensed vibration to a corresponding operating command.

For example, the operating command may be used on an alarm clock application. In other words, when the user pats on a nearby table, the processing circuit may determine and close the alarm clock.

In another embodiment, the processing circuit analyzes a voice fetched by the microphone or an image fetched by the camera for determining if a preset condition occurs. When the preset condition occurs, the processing circuit issues a notice to at least one external device via the network interface. The preset condition may include a condition that a user needs help.

For example, if the smart electronic device or its cooperative device senses an emergency call of an aged or a patient, or crying or quilt-kicking of a baby, the smart electronic device may inform a certain user in the proximity of a certain cooperative device.

For example, the smart electronic device may determine a current location of a user that can help by cooperating with cooperative devices of various locations. The smart electronic device may thereby activate a cooperative device or another smart electronic device of the corresponding location to remind or notify.

Besides, the issued notice may include a video or a frame fetched by the camera. For example, a mother may thereby be informed of her baby's crying and determine whether to deal with immediately or wait for a while.

Besides, the notice may be transmitted to other nearby or remote electronic devices, such as a cellphone or a computer.

In another embodiment, the processing circuit receives a sport or physiological information of a certain user from at least one smart sport device via the network, such as a number of steps of running/walking or heart beats. The processing circuit may activate different corresponding operations according to the sport or physiological information. For example, when the certain user eats, the processing circuit may provide diet recommendation information corresponding to the certain user.

In another embodiment, the smart electronic device may further include a human proximity sensor; when the human proximity sensor senses that no one is moving in the proximity of the smart electronic device, the processing circuit may enter a power saving mode. The human proximity sensor may receive sensing information via an infrared sensor or a ultrasound sensor. The sensor or an ultrasound sensor may be installed on the human proximity sensor or be disposed at another location in a wired or wireless manner.

Besides, when the smart electronic device senses human activities in its proximity, a switch may be designed to automatically activate the processing circuit for processing, or may be designed to automatically switch off the processing circuit or other devices to a sleeping mode when the sensed activities leave the proximity.

Besides, in another embodiment, the base may be disposed on a wireless charging base for wireless charging, and may not be in contact with from the wireless charging base.

Besides, in another embodiment, the smart electronic device may further include a luminance device installed on the housing. The luminance device may give corresponding luminance according to a control from the processing circuit.

From the foregoing, it will be appreciated that specific embodiments have been described herein for purposes of illustration, but that various modifications may be made without deviating from the spirit and scope of the present technology. Moreover, aspects described in the context of particular embodiments may be combined or eliminated in other embodiments. Further, although advantages associated with certain embodiments have been described in the context of those embodiments, other embodiments may also exhibit such advantages, and not all embodiments need necessarily exhibit such advantages to fall within the scope of the present technology.

The invention claimed is:

1. A smart electronic device for a multi-user environment to meet more convenient life requirements of a plurality of users, comprising:
a housing, having a base for disposition on a surface;
a camera, disposed at a specific location on the housing and configured to fetch an image of a user appearing before the camera;
a microphone, disposed at a specific position on the housing and configured to fetch a voice message issued by the user;
a processing circuit, installed on the housing, connected to the camera, configured to thereby load the image of the user for determining an identity of the user appearing before the camera, and configured to analyze a gesture of the user fetched via the camera or the voice message fetched via the microphone for transforming into a corresponding operating command;
a network interface installed on the housing, connected to the processing circuit for enabling the processing circuit to communicate with a cooperative device and an external server, and transmit cooperative operation requirements to an external server via the network interface, wherein the cooperative device is disposed at different locations of the multiple-user environment, and wherein the processing circuit and the cooperative device are configured to operate cooperatively at different positions of the multi-user environment via the network interface for providing inter-user applications to the plurality of users; and
a projector, installed on the housing, connected to the processing circuit, and configured to display a frame generated in correspondence to the operating command,
wherein the at least one cooperative device is plural and comprises a camera, and the processing circuit is configured to integrate video information collected by the camera of the smart electronic device and the camera of each of the plural cooperative devices via the network interface for integrally determining a current condition of the multi-user environment to combine the collective information into a single stream.

2. The smart electronic device of claim 1, wherein when the processing circuit displays a video, the processing circuit is configured to fast forward, play, or pause the frame displayed via the projector according to the operating command transformed from the fetched gesture of the user.

3. The smart electronic device of claim 1, the processing circuit is configured to determine the identity of the user according to the fetched voice message for determining whether to proceed operations based on the identity of the user.

4. The smart electronic device of claim 1, wherein the processing circuit is configured to determine the identity of the user according to the fetched voice message or the fetched image and thereby configured to display information corresponding to the user.

5. The smart electronic device of claim 1, wherein if the processing circuit finds that the plurality of users appear in a proximity of the smart electronic device, the processing circuit is configured to determine whether to display information corresponding to one of the plurality of users according to a preset rule.

6. The smart electronic device of claim 1, wherein the smart electronic device is configured to register at least one external server via the network interface according to the determined identity of the user and pre-stored register information, configured to integrate at least one information to the user having the determined identity, and configured to display to the user having the determined identity, wherein the at least one information is transmitted from the at least one external server.

7. The smart electronic device of claim 6, wherein the at least one information comprises a purchase information that enables the user having the determined identity to directly order for purchasing.

8. The smart electronic device of claim 7, wherein the user having the determined identity issues the voice message via the microphone to directly order for purchasing.

9. The smart electronic device of claim 7, wherein the purchase information comprises a multimedia information provided via the projector to the user having the determined identity for reference.

10. The smart electronic device of claim 1, wherein the processing circuit is configured to connect to an external server via the network interface for retrieving a time information that indicate an arrival time when a public transportation vehicle arriving a station, and configured to calculate a proper time based on the retrieved time information and a moving time interval that the user takes to arrive the station for reminding the user at the calculated proper time of starting off to the station for taking the public transportation vehicle.

11. The smart electronic device of claim 1, wherein the processing circuit is configured to connect to an external server via the network interface for retrieving a time information that indicates an arrival time of a rent vehicle, and configured to calculate a proper time based on the retrieved time information and a moving time interval that the user takes to arrive the station for reminding the user at the calculated proper time of starting off to the station for taking the rent vehicle.

12. The smart electronic device of claim 1, wherein one of the plural cooperative devices comprises a feeding device, and the processing circuit is configured to control the plural cooperative devices via the network interface for feeding a pet via the feeding device.

13. The smart electronic device of claim 1, wherein the processing circuit is configured to automatically edit frames fetched by the camera of the smart electronic device and frames fetched by the cameras of the cooperative devices for generating at least one subscrible video stream.

14. The smart electronic device of claim 13, wherein the processing circuit is configured to determine a current location of a certain user in the multi-user environment according to the at least one integrated video stream.

15. The smart electronic device of claim 14, wherein the processing circuit is configured to transmit a multimedia information to one of the plural cooperative devices corresponding to a location of a certain user for displaying.

16. The smart electronic device of claim 1, wherein the processing circuit is configured to transmit a scheduled task to one of the plural cooperative devices for further processing when electricity of the smart electronic device is lower than a predetermined value.

17. The smart electronic device of claim 1 further comprises a vibration sensor, wherein the processing circuit is configured to transform vibration to a corresponding operating command, wherein the vibration is transmitted from the base to the vibration sensor.

18. The smart electronic device of claim 17, wherein the operating command is used for an alarm clock application.

19. The smart electronic device of claim 1, wherein the processing circuit is configured to analyze a voice fetched by the microphone or an image fetched by the camera for determining if a predetermined condition occurs, and is configured to issue a notice to at least one external device via the network interface when the predetermined condition occurs.

20. The smart electronic device of claim 19, wherein the predetermined condition comprises a situation that a user needs help.

21. The smart electronic device of claim 20, wherein the situation comprises a call from an aged person, a call from a patient, a baby's kicking on a quilt, or a crying from the baby.

22. The smart electronic device of claim 20, wherein the issued notice comprises the video recorded by or the frame fetched by the camera.

23. The smart electronic device of claim 21, wherein the external device is another one cooperative device programmed to assist users in its proximity.

24. The smart electronic device of claim 1, wherein the processing circuit is configured to receive a sport information corresponding to a certain user transmitted by at least one smart sport device, and is configured to provide a meal recommendation information corresponding to the certain user when the certain user meals.

25. The smart electronic device of claim 1, further comprising a human proximity sensor, wherein when nobody is active in the proximity of the smart electronic device, the processing circuit is configured to enter a power saving mode.

26. The smart electronic device of claim 1, further comprising a human proximity sensor, wherein when the human proximity sensor senses human activities in the proximity of the smart electronic device, the processing circuit is configured to be automatically activated to start functioning.

27. The smart electronic device of claim 1, wherein the base is disposed on a wireless charging base for wireless charging, and the base is detachable from the wireless charging base.

28. The smart electronic device of claim 1, further comprising a luminance device disposed on the housing, wherein the luminance device is configured to provide corresponding luminance effects controlled by the processing circuit.

* * * * *